3,792,105
PROCESS FOR THE PURIFICATION OF ISOPRENE
Robert H. Siegmann, Amsterdam, Netherlands, assignor to Shell Oil Company, New York, N.Y.
Filed Oct. 11, 1972, Ser. No. 296,712
Claims priority, application Netherlands, Oct. 29, 1971, 7114983
Int. Cl. C07c 7/00
U.S. Cl. 260—681.5 R                  10 Claims

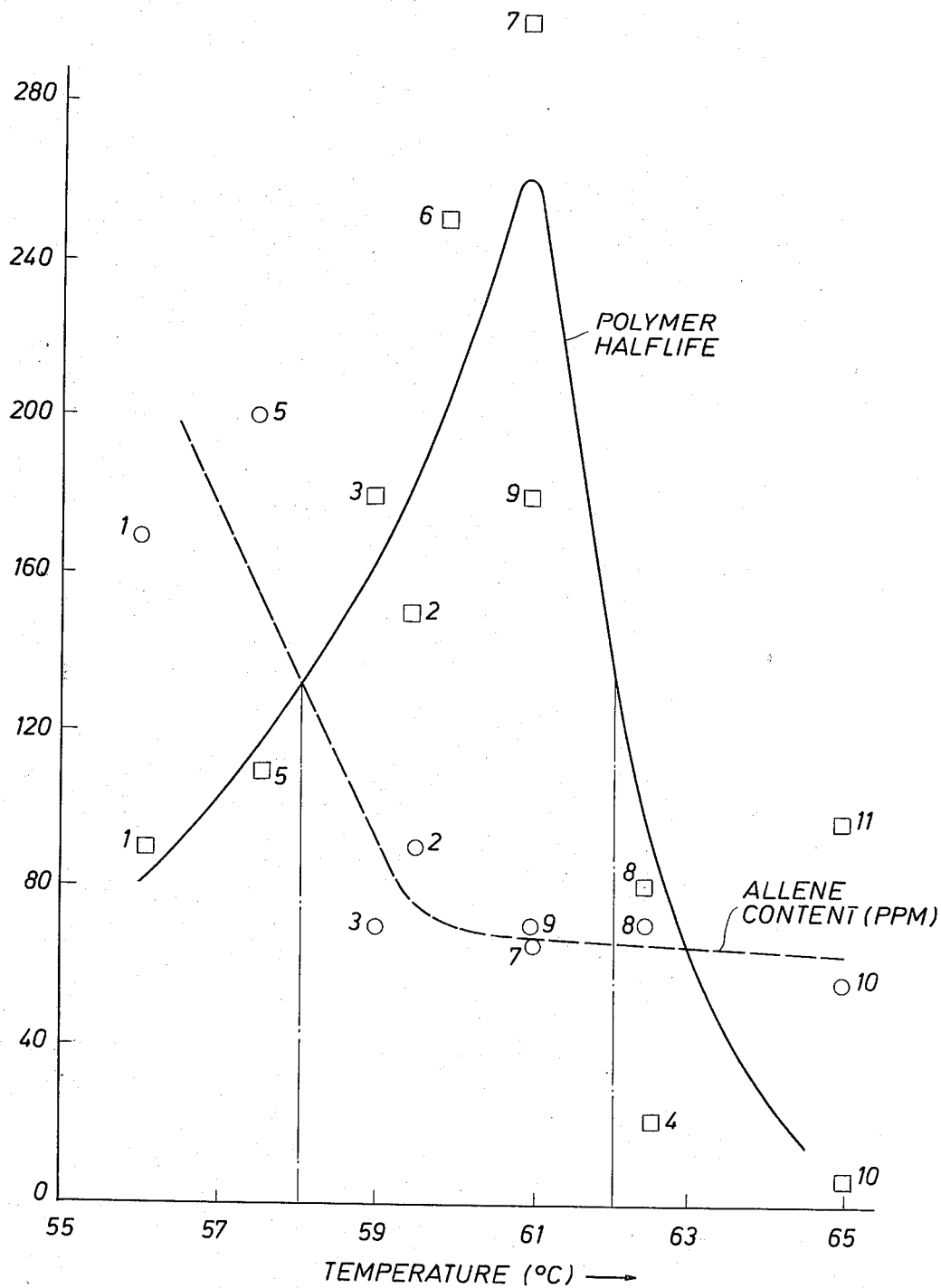

ABSTRACT OF THE DISCLOSURE

A process for the removal of allenes and other compounds hindering the polymerization of isoprene from an isoprene-containing $C_5$ hydrocarbon fraction comprises contacting said fraction with finely dispersed metallic sodium at a temperature in the range between 58 and 62° C.

---

This invention relates to a process for the removal of allenes and other compounds hindering the polymerization of isoprene from a $C_5$-fraction containing isoprene and allenes destined for polymerization, which fraction may also contain other compounds hindering the polymerization of isoprene, by successively contacting said $C_5$-fraction with finely dispersed metallic sodium, within a narrow temperature range, and separating it from metallic and bound sodium. The invention also relates to a process for the preparation of polyisoprene, in particular stereospecific polyisoprene, and to a process for the manufacture of shaped objects.

A "$C_5$-fraction" is herein defined as a hydrocarbon fraction consisting substantially of hydrocarbons having 5 carbon atoms per molecule.

It is known that isoprene can be polymerized stereospecifically to polyisoprene having a high cis-1,4 content. This structure is identical with that of natural rubber and for this reason polyisoprene is a particularly attractive elastomer; it can be used, as a starting material in the manufacture of, for example, tires for motor vehicles and airplanes, mechanical goods, footwear and the like.

Two examples of a stereospecific catalysts are catalysts of the hydrocarbyllithium type, such as sec-butyllithium, and catalysts of the Ziegler type which are prepared from organometallic compounds, such as trialkylaluminum compounds, and transition metal halides such as titanium tetrachloride.

It is known that the presence of allenes during the polymerization of isoprene causes difficulties. The presence of allenes may result in a relatively low molecular weight of the polyisoprene and consequently adversely affect the quality of the rubber, especially the loss of important properties such as tensile strength. Moreover, the presence of allenes leads to an increase in catalyst consumption. These drawbacks become increasingly serious with increasing allene content of the $C_5$-fraction to be polymerized and are particularly troublesome at allene contents above 130 and especially above 200 p.p.m.w. (parts by weight per one million parts by weight of $C_5$-fraction). Other compounds hindering the polymerization of isoprene which may be present in the $C_5$-fraction are 1,3-cyclopentadiene, alpha-alkynes, oxygen and sulfur compounds.

Hindrance of the polymerization is reflected in a relatively short half-life of the living polymer. The term "half-life of the living polymer" herein means the period of time in which the concentration of lithium-containing-living chains is halved. This time is important, since a decrease of said half-life means an increase in rate of de-activation, and consequently die-out of the living polymer, which leads to a decrease of the molecular weight of the final polymer product.

It is known from U.S. Pat. 2,398,973 that $C_5$-fractions intended for polymerization can be freed from undesired compounds by a treatment with finely dispersed metallic sodium. Treatment with metallic sodium does result in an effective removal of 1,3-cyclopentadiene and alpha-alkynes, and also, if present, of oxygen compounds, sulfur and sulfur compounds. Applicant has found, however, that in many cases the allenes are not removed or only to a slight extent, resulting, in a relatively short half-lief of the living polymer. It also appeared that in other cases the allenes were removed to a considerable degree by a sodium treatment, but that, in spite of this, a relatively short half-life was found.

It has now been found that to obtain a relatively long half-life of the living polymer that the $C_5$-fraction must be treated with sodium in a special temperature range.

The invention can be defined as a process for the removal of allenes and other compounds hindering the polymerization of isoprene from a $C_5$-fraction containing isoprene and allenes destined for polymerization, which fraction may also contain other compounds hindering the polymerization of isoprene, by successively contacting said $C_5$-fraction with finely dispersed metallic sodium and separating said $C_5$-fraction from metallic and bound sodium wherein the $C_5$-fraction, during contact with the metallic sodium, is maintained at a temperature between 58° and 62° C.

Surprisingly, it has been found that the half-life of the living polymer as a function of the temperature at which the $C_5$-fraction is kept during the treatment with metallic sodium preceding polymerization shows a maximum. The half-life passes through this maximum when said temperature rises from 58° to 62° C.; upon treatment of the $C_5$-fraction in this temperature range half-lives are obtained that are usually longer than 130 minutes (when employing a hydrocarbyllithium compound as catalyst and at 40° C.). If during the treatment with metallic sodium the $C_5$-fraction is maintained at a temperature outside the range of 58–62° C., half-lives are obtained that are usually shorter than 130 minutes.

During contact with the metallic sodium the temperature of the $C_5$-fraction is preferably set to a value between 59° and 61° C., since in that range the longest half-lives are obtained, usually longer than 175 minutes (when employing a hydrocarbyllithium compound as catalyst and at 40° C.).

It has also been observed that from $C_5$-fractions having a relatively high allene content, higher than for example 200 p.p.m.w., allenes can only be removed to a considerable degree, to below 130 p.p.m.w., for example if these fractions are contacted with sodium at a temperature of at least 58° C. Allenes are also removed to a considerable extent when they are contacted with the sodium at temperatures higher than 62° C., but at temperatures above 62° C. half-lives shorter than 130 minutes are obtained.

The $C_5$-fractions treated according to the present process are very suitable for the preparation of polyisoprene; particularly because polyisoprene with very good properties is obtained and also because during the polymerization a considerable proportion of the isoprene is converted into polyisoprene. The rubber can have a high molecular weight e.g., an intrinsic viscosity of for example 7–9 dl./g. and a high cis-1,4 content of for example 92–95%.

A sodium dispersion can easily be prepared by heating solid sodium in a suitable inert liquid until it has liquefied and subsequently mixing the two liquids vigorously, for example by stirring. If desired, a dispersant may be added to the mixture to accelerate the dispersion and to reduce the dimensions of the sodium particles. Examples of dispersants are fatty acids with a long carbon chain such as, oleic acid, also higher alcohols and esters, and some finely dispersed inert solids such as carbon. By cooling the mixture down to temperatures below 98° C. the sodium forms solid particles which remain dispersed. The liquid which constitutes the homogeneous phase can be any liquid which is essentially inert to sodium, the $C_5$-fraction and the desired polymerization catalyst. Exemplary are hydrocarbon fractions having a boiling range at atmospheric pressure from about 50 to about 500° C., for example, gasoline, kerosene, gas oil and lubricating oil distillates, or aromatic hydrocarbons such as xylene. Mineral lubricating oil fractions are to be preferred since sodium readily remains dispersed therein. The sodium dispersions may contain up to about 50% w. of metallic sodium; the dispersed sodium has a very large specific surface area.

The particle size of the finely dispersed metallic sodium suspended in a liquid is not restricted to a sharply defined range. However, to facilitate shorter duration of the treatment and lower consumption of metallic sodium it is preferred to employ dispersions having sodium particles, particularly dispersions wherein half the number of sodium particles is smaller than 5 microns and most preferably smaller than 3 microns. The concentration in which the metallic sodium is present in this liquid, is not critical. The upper limit is of course determined by the quantity of sodium the liquid can take up. However, with increasing sodium content it comes increasingly difficult to make very small sodium particles, while the pumpability of the dispersion is also reduced. Accordingly, it is recommended that sodium concentrations be kept below 30% w., calculated on the total dispersion. It is further recommended that a sodium concentration above 10% w. be employed in order to restrict the consumption of liquid in which the sodium has been dispersed. For contacting with metallic sodium suspended in a liquid, the $C_5$-fraction may be in the gaseous or in the liquid phase or may be a mixture of the two phases. Preferably, the $C_5$-fraction should be mixed in the liquid phase with a liquid soluble in the $C_5$-fraction containing suspended metallic sodium, resulting in better contacting with the sodium and more rapid removal of the compounds hindering the polymerization of isoprene.

Allenes are usually removed to a sufficient degree if the $C_5$-fraction is contacted with the metallic sodium for at least 40 and preferably for at least 60 minutes. The period of contact should not exceed about 80 minutes and especially not exceed 120 minutes since as a rule the half-life of the living polymer is not extended, while in that case some polymerization of isoprene may be expected, because certain sodium compounds promote the polymerization of isoprene, at least to some extent. Accordingly, the $C_5$-fraction is preferably brought into contact with the metallic sodium for a period between 40 and 120 minutes and more preferably between 60 and 80 minutes; under these conditions only a small part of the isoprene polymerizes, for example from 0.1 to 2%.

The compounds other than allenes, hindering the polymerization of isoprene react relatively rapidly with metallic sodium. Allenes react more slowly than the other hindering compounds. To obtain a relatively long half-life it is usually sufficient to apply the metallic sodium in such a quantity that, at the end of the treatment, the $C_5$-fraction still contains at least 0.3% w. of metallic sodium calculated on the $C_5$-fraction. Higher final sodium concentrations as a rule, yield little or no advantage.

The process according to the present invention can be performed batchwise, but more preferably is continuously performed. Contacting of the $C_5$-fraction with the metallic sodium can be effected in one or more reactors preferably provided with stirring equipment. These reactors may be connected in series or in parallel. If the reactors are placed in series, fresh sodium may be led into the first, and, if desired, also into one or more of the following reactors. The metallic sodium is very efficiently employed if the liquid $C_5$-fraction is successively led through a first and a second reactor, and, if desired, through more reactors operated in series and the liquid containing-suspended-metallic sodium is first introduced into the final reactor i.e., placed farthest downstream with respect to the direction of flow of the $C_5$-fraction. The metallic and bound sodium can be separated from the $C_5$-fraction discharged from the last-mentioned reactor and recycled to the first reactor. The $C_5$-fraction leaving the first reactor then still contains a certain quantity of the allenes and only traces of the compounds reacting relatively rapidly with sodium. The second and any following reactors then mainly serve to further decrease the allene content of the $C_5$-fraction.

After the treatment with metallic sodium the $C_5$-fraction contains metallic and bound sodium, the liquid in which the fresh sodium was dispersed and a small quantity of isoprene polymer. From this mixture a $C_5$-fraction must be separated that is suitable for polymerization. This may be accomplished as follows. Metallic and bound sodium can be separated first, for example, by means of filtration, centrifugation or decantation. Subsequently, the $C_5$-fraction can be purified by means of distillation; a $C_5$-fraction suitable for polymerization is obtained as the top product, while isoprene polymers and the liquid in which the fresh sodium was dispersed (where this had a boiling range or boiling point higher than that of the $C_5$-fraction) are left in the residue. It has been found, however, that a $C_5$-fraction suitable for polymerization can very easily be separated by directly leading the whole reaction mixture formed during the contact with the metallic sodium into an expansion vessel and by separating it therein into a gaseous $C_5$-fraction and a liquid fraction which contains compounds with a boiling point above the boiling range of the $C_5$-fraction and metallic and bound sodium. The latter separation method proceeds very well and is to be preferred because of its simplicity. If required, contacting means (such as trays, for instance grid or sieve-trays) can be installed in this expansion vessel. Condensation of the gaseous $C_5$-fraction discharged from the expansion vessel yields a $C_5$-fraction suitable for polymerization. It is recommended that the expansion vessel be equipped with a reboiler. If desired a dry, inert gas, for instance nitrogen or a rare gas, can be passed through the liquid present in the expander, in order to recover isoprene carried along to the reboiler.

The allene-containing $C_5$-fractions to be treated according to the invention may originate from any source, for instance from reaction products obtained by thermal cracking of hydrocarbon fractions, such as gasoline, naphtha, gas, oil, lubricating oil or paraffin fractions (in particular fractions with a boiling range at atmospheric pressure between 50° and 250° C.) in the gas phase in the presence of steam, for the preparation of ethene with simultaneous formation of $C_5$ and aromatic hydrocarbons. The $C_5$-fractions originating from the latter source contain alkynes and piperylenes and have, as a rule, a relatively high 1,3-cyclopentadiene content, for example 10 to 20% w. It is recommended that this $C_5$-fraction be separated to the largest possible extent from relatively low boiling components by means of fractional distillation, for instance from 1,4-pentadiene, 1-butyne and 1,2-butadiene and from relatively high-boiling components, for instance, 1,2-pentadiene, 1-pentyne trans-1,3-pentadiene and 1,3-cyclopentadiene. After the fractional distillation a large proportion of the 1,3-cyclopentadiene left in the $C_5$-fraction can be removed by a separate treatment, for instance, by (a) thermal dimerization (in two stages or not with intermediate removal of dicyclopentadiene by means of distillation) followed by removal of dicyclopentadiene by means of distillation, by (b) treatment of the $C_5$-fraction with a 1,2-olefinically unsaturated carboxylic acid followed by separation of Diels-Alder adducts formed in this treatment, or (c) extractive distillation. By such pretreatment the 1,3-cyclopentadiene content of the $C_5$-fraction can be reduced to for instance, 0.1–1.0% w.

$C_5$-fractions prepared by catalytic dehydrogenation of 2-methyl-1-butene, 2-methyl-2-butene, 3-methyl-1-butene or 2-methylbutane generally have a relatively low allene content, but, if required, the present process can be applied to these fractions.

The $C_5$-fraction product after treatment according to the present invention generally contains some piperylene and monoolefins, such as pentenes, but this is not objectionable when the isoprene is polymerized in the presence of an organolithium catalyst and particularly a lithium-hydrocarbyl compound initiator. For the polymerization, alkyllithium compounds in which the alkyl group contains 2 to 8 carbon atoms are preefrred, such as for example, sec-butyllithium, n-butyllithium and n-amyllithium. Sec-butyllithium is particular preferred because it initiates the polymerization especially rapidly.

EXAMPLE

A $C_5$-fraction was isolated by means of fractional distillation from a reaction product obtained by thermal cracking of a gasoline in the gas phase in the presence of steam. 1,3-cyclopentadiene in this $C_5$-fraction was thermally dimerized and the dicyclopentadiene formed was separated therefrom by means of distillation. The $C_5$-fraction after separation of the dicyclopentadiene had a composition as shown in Table A.

TABLE A

| Component: | Percent wt. |
|---|---|
| Isoprene | 30.2 |
| Piperylenes | 1.2 |
| Internal alkynes | 0.50 |
| Alpha-alkynes | 0.39 |
| 1,3-cyclopentadiene | 0.26 |
| Allenes | 0.0339 |
| $C_5$-alkynes | 39.0 |
| $C_5$-alkanes | 28.4 |

A sodium dispersion was prepared by vigorously stirring "Shell Talpa" oil 30 ("Shell Talpa" is a trademark for a mineral lubricating oil; the oil 30 applied here had a viscosity of 9.0° E and 1.82° E at 50° and 100° C., respectively) with 19.3% w. of metallic sodium at a temperature of 180° C.; the dispersion contained 18.3% w. of metallic and 1.0% w. of bound sodium, calculated on the total. The concentration of metallic sodium was calculated from the hydrogen volume formed by reaction of a sample of the dispersion with 2-methoxy-ethanol. Microscopic observation showed a particle size distribution as given in Table B.

TABLE B

| | Quantity calculated on total sodium | |
|---|---|---|
| Percent of total | Cumulative, percent | Dimension of sodium particles, microns |
| 9 | 9 | <1.1 |
| 21 | 30 | 1.1–1.8 |
| 18 | 48 | 1.8–2.5 |
| 14 | 62 | 2.5–3.2 |
| 12 | 74 | 3.2–3.9 |
| 9 | 83 | 3.9–4.6 |
| 7 | 90 | 4.6–5.3 |
| 10 | 100 | >5.3 |

The $C_5$-fraction having the composition shown in Table A was passed through two cylindrical reactors operated in series and provided with a vigorous stirrer, while at the same time fresh sodium dispersion was led into the first reactor. The reaction mixture discharged from the second reactor was introduced into an expansion vessel equipped with a reboiler, in which the $C_5$-fraction evaporated at atmospheric pressure and in which a residue containing the lubricating oil fraction, sioprene polymer and metallic and bound soidum was left. The temperatures at the top and at the bottom of the expansion vessel were 32° and 34° C., respectively; in the latter case the expansion vessel was a column provided with the packing material conventionally employed in a Vigreux column. In order to remove the isoprene effectively from the residue, the temperature of the residue in the reboiler was kept at 48° C. while nitrogen was passed through. This nitrogen had previously been passed through a fixed bed of alumina at a temperature of 25° C., on to which finely dispersed metallic copper had been applied, and through a fixed bed of a molecular sieve, to remove oxygen and water to a content lower than 0.5 part per million volume (p.p.m.v.) and 0.1 p.p.m.v., respectively.

The vapor separated from the expension vessel was condensed at −15° C. A one liter sample of the resulting condensate was heated at 40° C. in a glass reactor. Then, while stirring vigorously, sec-butyllithium (dissolved in isooctane, concentration 20 mmols./l.) was slowly added till, suddenly as a result of the beginning of the polymerization, the temperature of the sample increased by some tenths ° C. This required 2–4 p.p.m.v. of sec-butyllithium calculated on the $C_5$-fraction. Then an additional 0.04 mmol of secbutyllithium, was added. During the polymerization, which was carried out at 40° C., the isoprene content of the sample was determined at four or five intervals and the reaction constant of the polymerization was calculated for each interval from the determined isoprene contents; the polymerization of isoprene is a first-order reaction. The calculated reaction constants were divided by 0.0015, which number represents the specific rate constant at 40° C. and 1 p.p.m. of sec-butyllithium, expressed as min.$^{-1}$ p.p.m.$^{-1}$. The quotients from the divisions represent the concentrations of living polymer, which were graphically plotted logarithmically against time. A straight line was

TABLE C

| | Reactors | | Sodium added, percent w. on $C^5$-fraction | Sodium consumption, g./kg. $C^5$-fraction | Condensed $C^5$-fraction | | Polymerization | |
|---|---|---|---|---|---|---|---|---|
| Experiment number | Total residence time in the two | Temp., ° C. | | | Isoprene recovered, percent | Allene content, p.p.m. | Halflife of living polymer, min. | Isoprene conversion after 240 min., percent |
| 1 | 70 | ¹56 | 1.5 | 8.5 | 95.6 | 170 | 90 | 48.3 |
| 2 | 70 | 59.5 | 1.5 | 9.4 | 97.3 | 90 | 150 | 58.2 |
| 3 | 70 | 59 | 1.2 | 7.4 | 98.0 | 70 | 180 | 61.03 |
| 4 | 70 | ¹62.5 | 1.2 | 7.4 | 97.4 | (²) | 20 | 16.0 |
| 5 | 70 | ¹57.5 | 1.0 | 7.2 | 97.6 | 200 | 110 | 52.5 |
| 6 | 90 | 60 | 1.0 | 7.1 | 96.7 | (²) | >250 | 68 |
| 7 | 90 | 61 | 1.0 | 7.2 | 96.8 | 65 | >300 | 72 |
| 8 | 70 | ¹62.5 | 1.0 | 6.8 | 96.7 | 70 | 80 | 45.6 |
| 9 | 120 | 61 | 0.9 | 7.0 | 98.4 | 70 | 180 | 61.0 |
| 10 | 70 | ¹65 | 0.9 | (²) | 98.7 | 55 | <5 | 4 |
| 11 | 140 | ¹65 | 0.9 | 6.5 | 96.3 | (²) | 95 | 49.4 |

¹ Not according to the invention.
² Not determined.

drawn through the plots and from this line the desired half-life of the living polymer was read off.

Eleven experiments were carried out, in which the temperatures of the residence times in the reactors and the quantities of sodium led into the first reactor was varied. The relevant data and experimental results are given in Table C. In all eleven experiments the sodium treatment had decreased the alpha-alkylne and 1,3-cyclopentadiene contents to a value below 5 p.p.m. The percentage of isoprene recovered was obtained by multiplying by 100 the quotient of the concentrations of isoprene in the condensate and in the untreated (feed) $C_5$-fraction.

The results in Table C are represented graphically in the figure wherein the temperature in the reactors in ° C. has been plotted along the horizontal axis. Along the vertical axis of the figure are indicated in both the half-life of the living polymer, expressed in minutes, and the allene content of the condensed $C_5$-fraction, expressed as parts per million (weight). The half-lives are denoted by squares and the allene contents by circles. The figures near the squares and circles correspond to the numbe of the experiment going with these squares and circles. The drawn line represents the half-life of the living polymer and the dashed-line the allene content of the condensed $C_5$-fraction as a function of the temperature at which the sodium was treated. The two vertical dash-dot lines mark the temperature range 58–62° C.

I claim as my invention:

1. Process for the removal of allenes and other compounds hindering the polymerization of isoprene from a hydrocarbon $C_5$-fraction, containing isoprene and allenes comprising successively contacting said $C_5$-fraction with finely dispersed metallic sodium, and separating it from metallic and bound sodium, wherein during said contacting the C-fraction is maintained at a temperature between 58° and 62° C.

2. Process according to claim 1, wherein the temperature of the $C_5$-fraction is maintained between 59° and 61° C.

3. Process according to claim 1 wherein a said dispersed sodium comprised liquid suspension in which more than half the number of sodium particles is smaller than 5 microns.

4. Process according to claim 3 wherein more than half the number of sodium particles is smaller than 3 microns.

5. Process according to claim 1 wherein the contacting of the $C_5$-fraction with the sodium is effected by mixing the $C_5$-fraction in the liquid state with an inert liquid soluble in the $C_5$-fraction and containing suspended metallic sodium.

6. Process according to claim 1 wherein said $C_5$-fraction is contacted with the metallic sodium for a period of time between 40 and 120 minutes.

7. Process according to claim 1 wherein the $C_5$-fraction is contacted with the metallic sodium for a period of time between 60 and 80 minutes.

8. Process according to claim 1 wherein the amount of metallic sodium is such that at the end of the contacting with the sodium the $C_5$-fraction still contains at least 0.3% w. of metallic sodium, calculated on the $C_5$-fraction.

9. Process according to claim 1 wherein the $C_5$-fraction has been obtained by thermal cracking of a hydrocarbon distillate in the gas phase in the presence of steam.

10. Process according to claim 9 wherein the hydrocarbon distillate has a boiling range at atmospheric pressure between 50° and 250° C.

References Cited
UNITED STATES PATENTS

| | | | |
|---|---|---|---|
| 2,398,973 | 4/1946 | Soday | 260—681.5 |
| 2,935,540 | 5/1960 | Wolfe | 260—681.5 |
| 3,091,653 | 5/1963 | Nogradi | 260—681.5 |
| 3,285,989 | 11/1966 | Wolfe et al. | 260—681.5 |

PAUL M. COUGHLAN, JR., Primary Examiner

U.S. Cl. X.R.

260—94.2 M